United States Patent
Tanaka et al.

(10) Patent No.: US 9,841,642 B2
(45) Date of Patent: Dec. 12, 2017

(54) LIQUID CRYSTAL DISPLAY DEVICE

(71) Applicant: Panasonic Liquid Crystal Display Co., Ltd., Himeji-shi, Hyogo (JP)

(72) Inventors: Katuji Tanaka, Kyoto (JP); Daisuke Kajita, Hyogo (JP)

(73) Assignee: Panasonic Liquid Crystal Display Co., Ltd., Hyogo (JP)

( * ) Notice: Subject to any disclaimer, the term of this patent is extended or adjusted under 35 U.S.C. 154(b) by 0 days.

(21) Appl. No.: 15/085,623

(22) Filed: Mar. 30, 2016

(65) Prior Publication Data

US 2017/0285418 A1    Oct. 5, 2017

(51) Int. Cl.
  *G02F 1/1343*  (2006.01)
  *G02F 1/1362*  (2006.01)
  *G02F 1/1335*  (2006.01)

(52) U.S. Cl.
  CPC .. *G02F 1/134336* (2013.01); *G02F 1/133512* (2013.01); *G02F 1/133514* (2013.01); *G02F 1/136286* (2013.01); *G02F 2001/134345* (2013.01)

(58) Field of Classification Search
  CPC ........ G02F 2001/134345; G02F 2001/134372; G02F 2001/133357; G02F 1/1335; G02F 1/136; G02F 1/136286; G02F 1/1368; G02F 1/134309; G02F 1/133345; G02F 1/133514; G02F 1/133512; G02F 1/134363; G02F 1/134336; G02F 1/133707; G02F 1/136209; G02F 1/13306; G02F 1/133; G02F 1/1362; G02F 1/1343; G02F 1/1333; G02F 2201/123; G02F 2201/52; G09G 2300/0452; G09G 3/2003; G09G 3/2074; H01L 27/3276; H01L 27/3216; H01L 27/3218; H01L 29/78669; H01L 29/78633
  USPC ... 349/110, 139, 138, 141, 106, 43, 65, 144, 349/143
  See application file for complete search history.

(56) References Cited

U.S. PATENT DOCUMENTS

2015/0092133 A1    4/2015  Kajita
2015/0309360 A1*  10/2015  Wang ................... G09G 3/3607
                                            345/694

* cited by examiner

*Primary Examiner* — Thoi Duong
(74) *Attorney, Agent, or Firm* — Hamre, Schumann, Mueller & Larson, P.C.

(57) ABSTRACT

Embodiments of a Liquid Crystal Display (LCD) device are disclosed. The LCD includes a backlight to illuminate a display panel with a plurality of sub-pixels, which include a first sub-pixel having a first color filter, a second sub-pixel having a second color filter having a different color from the first color filter, and a third sub-pixel having a third color filter having a different color from the first color filter and the second color filter.

The LCD display panel includes a plurality of drain lines formed between the plurality of sub-pixels, the plurality of drain lines arranged as a first type of drain line set and a second type of drain line set, where the first type of drain line set includes only a single drain line positioned between two adjacent sub-pixels, and the second type of drain line set includes only two drain lines positioned between two adjacent sub-pixels.

20 Claims, 11 Drawing Sheets

LIQUID CRYSTAL DISPLAY DEVICE

FIELD

This disclosure relates generally to a display device. More specifically, this disclosure relates to a liquid crystal display (LCD) device.

BACKGROUND

A liquid crystal display generally includes a thin film transistor substrate (hereinafter referred to as "TFT substrate") located on a back surface side, a color filter substrate located on a front surface side (display surface side) and opposed to the TFT substrate, and a liquid crystal layer sandwiched between the TFT substrate and the CF substrate. Color filters for different colors (for example, red color, green color, and blue color) and a light shielding portion (hereinafter referred to as "black matrix") located at a boundary between the respective color filters are formed in the CF substrate.

SUMMARY

This disclosure relates generally to a display device. More specifically, this disclosure relates to a liquid crystal display (LCD) device.

For liquid crystal display devices, an occurrence of color mixture can deteriorate the quality of the image. Color mixture is a blending of colors which results in the visual color display being deteriorated and/or distorted, particularly in a case where a line of sight of a retina of a viewer's eye is in a diagonal direction relative to the liquid crystal display device. Color mixture can be the result of a leaking of light from adjacent sub-pixel regions, a viewing angle of a viewer, and/or the nature of the human eye. For example, a red pixel can exhibit a color tint mixed with another color (e.g., green color, blue color, etc.) when viewed diagonally, thereby deteriorating the display quality of the liquid crystal display device. Black matrices can be used to prevent some of this color mixing by shielding light passing through undesired color filters when viewed by a human at oblique angles. Increasing the size of the black matrix can reduce the amount color mixing that can be viewed.

The embodiments described herein provide an LCD that includes a display panel and a backlight to illuminate the display panel. The display panel includes a plurality of gate lines extending in a first direction, a plurality of drain lines extending in a second direction, and a plurality of sub-pixels arranged in a matrix. The plurality of sub-pixels include a first sub-pixel having a first color filter, a second sub-pixel having a second color filter having a different color from the first color filter, and a third sub-pixel having a third color filter having a different color from the first color filter and the second color filter. The display panel further includes a plurality of drain lines formed between the plurality of sub-pixels, the plurality of drain lines arranged as a first type of drain line set and a second type of drain line set. The first type of drain line set may include only a single drain line positioned between two adjacent sub-pixels, and the second type of drain line set may include only two drain lines positioned between two adjacent sub-pixels.

BRIEF DESCRIPTION OF THE DRAWINGS

Reference is now made to the drawings in which like reference numbers represent corresponding parts throughout.

DETAILED DESCRIPTION

Figure 1:
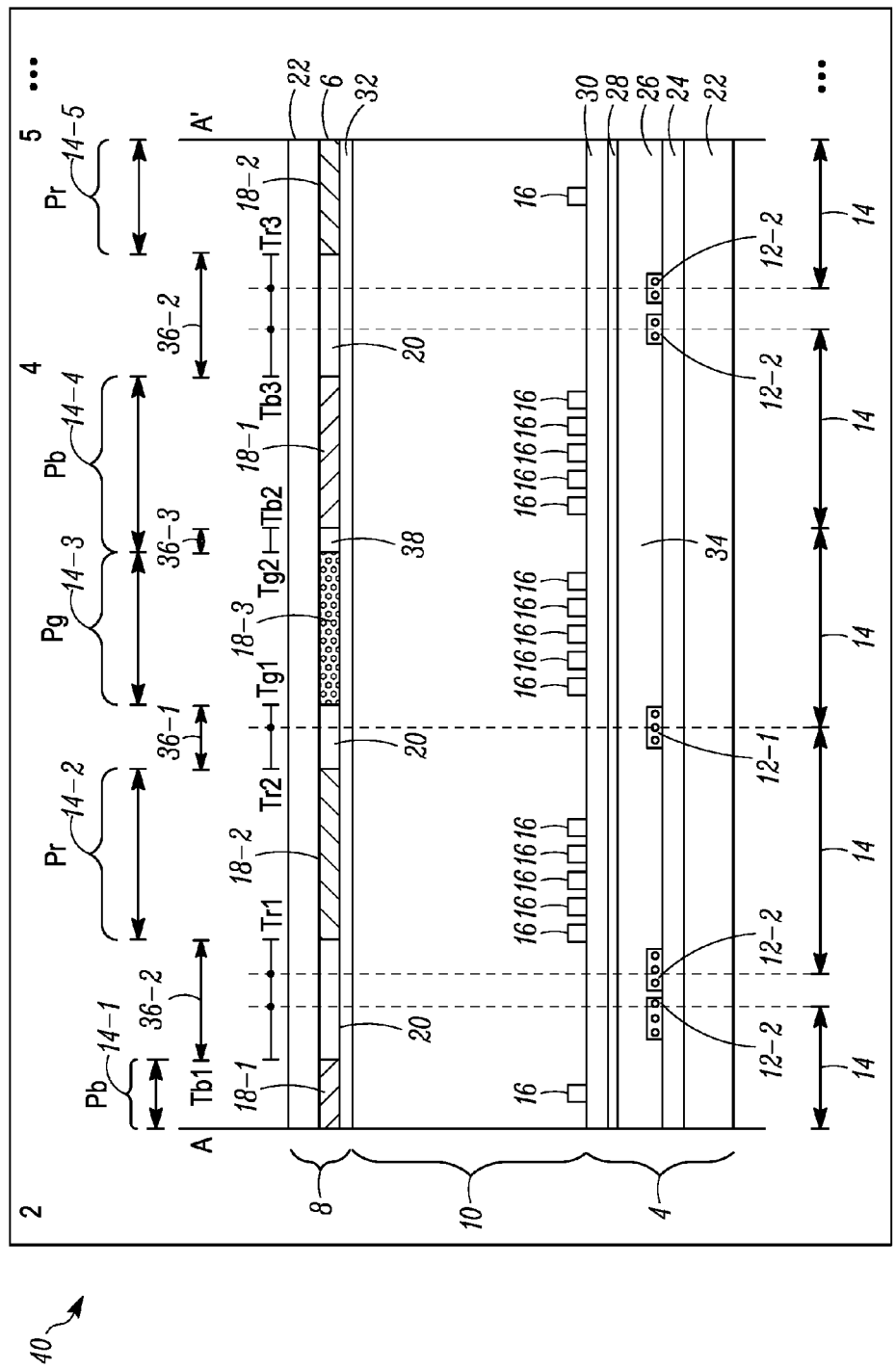
FIG. 1 illustrates a sectional view of a display region of a liquid crystal display device, according to an embodiment of the disclosure.

A liquid crystal display (LCD) device applies light modulating properties of liquid crystals to display high quality images across a screen for visual viewing. An LCD device may be composed of red, blue, and green sub-pixels, the light from which combine/add in various proportions to produce all other colors as well as white and shades of gray.

For liquid crystal display (LCD) devices, an occurrence of color mixture can deteriorate the quality of the image. Color mixture is a blending of colors which results in the visual color display being deteriorated and/or distorted, particularly in a case where a line of sight of a retina of a viewer's eye is in a diagonal direction relative to the liquid crystal display device. Color mixture can be the result of a leaking of light from adjacent sub-pixel regions, a viewing angle of a viewer, and/or the nature of the human eye. For example, a red pixel can exhibit a color tint mixed with another color (e.g., green color, blue color, etc.) when viewed diagonally, thereby deteriorating the display quality of the liquid crystal display device. Black matrices can be used to prevent some of this color mixing by shielding light passing through undesired color filters when viewed by a human at oblique angles. Increasing the size of the black matrix can reduce the amount color mixing that can be viewed. However, increasing the size of the black matrix may impact the aperture ratio of the liquid crystal display device which can deteriorate the display quality of the liquid crystal display device.

It has been found that the retina of a human eye is less sensitive to color mixing with the green color than in other colors (e.g., blue color, red color, etc.). That is, the retina of a human eye can be more highly resistant to color mixture in the green color than in other colors (e.g., blue color, red color, etc.). The embodiments described herein can reduce color mixing of green light and non-green lights when an image is to be displayed. A plurality of drain lines and/or a non-drain line region can be formed between two adjacent sub-pixels among the plurality of sub-pixels 14 in an arrangement, which may decrease color mixture and/or improve image quality of the LCD device. Color mixture may correlate with an aperture ratio and/or an aperture width of the sub-pixel 14, and in general, as the aperture ratio increases, the color mixture is more likely to occur. The plurality of drain lines can be made of metal and/or have a width of about 4 micrometers or more. The metal properties of the plurality of drain lines can shield light from a color filter associated with a corresponding sub-pixel and/or the width of the plurality of drain lines can increase an aperture width between two adjacent sub-pixels. Formation or non-formation of the plurality of drain lines 12 can reduce an aperture ratio of the sub-pixel, while suppressing deterioration of the display quality ascribable to color mixture. Arranging the plurality of sub-pixels in particular arrangements, and/or formation of the plurality of drain lines 12 can decrease an aperture ratio of the sub-pixel, which can reduce color mixture.

FIG. 1 illustrates a sectional view of a display region 2 of a liquid crystal display (LCD) device 40, according to one embodiment of the disclosure. The display region 2 includes a thin film transistor substrate (hereinafter referred to as "TFT substrate"), which is a first substrate 4 located on a back surface side of the display panel, and a second substrate 8 located on a front surface side of the display panel (e.g., display surface side). The second substrate 8 is opposed to the first substrate 4. The display panel further includes a liquid crystal layer 10 sandwiched between the first substrate 4 and the second substrate 8.

The first substrate 4 (e.g., the TFT substrate) includes a gate line (not shown) that is formed on a glass substrate 22, a first insulating film 24 formed so as to cover the gate line, and a plurality of drain lines 12-1, 12-2 (generally referred to herein as a plurality of drain lines 12) are formed on the first insulating film 24. A second insulating film 26 is formed so as to cover the plurality of drain lines 12, and a common electrode 28 is formed on the second insulating film 26. Additionally, a third insulating film 30, such as Silicon Nitride (SiN), can be formed so as to cover the common electrode 28, and the pixel electrode 16 is formed on the third insulating film 30.

The plurality of drain lines 12 and a plurality of gate lines (not shown) (e.g., illustrated as 46 in FIGS. 2A-4B) are formed on the first substrate 4 so as to extend in a column direction and in a row direction, respectively. That is, the plurality of gate lines extend in a first direction, while the plurality of drain lines 12 extend in a second direction perpendicular to the first direction.

The plurality of drain lines 12 include a first type of drain line set 12-1 and a second type of drain line set 12-2. The first type of drain line set 12-1 includes only a single drain line, while the second type of drain line set 12-2 includes only two drain lines. A drain line set (e.g., 12-1, 12-2) among the plurality of drain lines 12 may be positioned between two adjacent sub-pixels to improve the LCD visual display quality, as described further herein.

A thin film transistor (not shown) (e.g., illustrated as 48 in FIGS. 2A-4B) (hereinafter referred to as "TFT") is formed in the vicinity of each of intersections between the plurality of drain lines 12 and the plurality of gate lines. An area surrounded by at least one of the plurality of drain lines 12 and two adjacent gate lines is defined as one sub-pixel 14. In some instances, the sub-pixel can be a rectangular area surrounded by two adjacent drain line sets at opposing sides of the sub-pixel (e.g., 12-1, 12-2) and two adjacent gate lines at another two opposing sides of the sub-pixel. In other instances, the sub-pixel can be a rectangular area surrounded by at least one drain line set (e.g., 12-1, 12-2) at one side of the rectangular area, a non-drain line region at an opposing side of the pixel, and two adjacent gate lines at another two opposing sides of the sub-pixel.

A plurality of sub-pixels 14 are arranged in a matrix shape (i.e., in a row direction and a column direction, illustrated in FIGS. 2A-4B) in the display region 2. A pixel electrode 16 is formed of a transparent conductive film, such as indium tin oxide (ITO) or the like, and is provided to each sub-pixel 14-1, 14-2, 14-3, 14-4, 14-5, etc. among the plurality of sub-pixels 14. Each of the pixel electrodes 16 includes an opening (e.g., a slit) to be formed to have a stripe shape. In the TFT, a semiconductor layer formed of amorphous silicon is formed on a gate insulating film, and a drain electrode and a source electrode (not shown) is formed on the semiconductor layer. The drain electrode is electronically connected to a drain line set among the plurality of drain lines 12, and the source electrode is electronically connected to the sub-pixel electrode via a contact hole.

The second substrate 8 includes a color filter substrate 6, a black matrix 20, and a plurality of color filters 18 formed on a glass substrate 22, and an overcoat layer 32 can be formed so as to cover those. In addition, although not shown, an alignment layer, a polarizing plate, and the like can be formed. In an embodiment, the LCD 40 can have a configuration using a so-called in plane switching (IPS) system, however, the display device according to the present invention is not limited thereto. The second substrate 8 may include the common electrode 28 instead of being included in the first substrate 4.

The color filter substrate 6 includes a light transmission portion (not shown) formed so as to correspond to each sub-pixel 14-1, 14-2, 14-3, 14-4, 14-5, etc. among the plurality of sub-pixels 14. A plurality of light transmission portions include a blue light transmission portion, in which a color filter 18-1 for a blue color is formed to transmit blue colored light; a red light transmission portion, in which a color filter 18-2 for a red color is formed to transmit red colored light; a green light transmission portion, in which a color filter 18-3 for a green color is formed to transmit green colored light. As such, the plurality of light transmission portions of the color filter substrate 6 includes the first color filter 18-1, the second color filter 18-2, and the third color filter 18-3 (referred to generally herein as a plurality of color filters 18) that are formed on the second substrate 8 and correspond to each sub-pixel among the plurality of sub-pixels 14.

The light transmission portion is surrounded by the black matrix 20 (e.g., a light shielding portion). The black matrix 20 is formed on the second substrate 8 to block light from transmitting therethrough, and/or is formed around each of the plurality of color filters 18. That is, the black matrix 20 shields light from transmitting through a boundary between the color filters 18-1, 18-2, 18-3, which may decrease color mixture. In the embodiment, as shown in FIG. 1, the black matrix 20 is formed to have a rectangular shape, although alternative shapes may be formed.

As illustrated in FIG. 1, the LCD device 40 includes the display region 2 with the plurality of sub-pixels 14. The plurality of sub-pixels 14 includes the first sub-pixel 14-1 having the first color filter 18-1, the second sub-pixel 14-2 having the second color filter 18-2 having a different color from the first color filter 18-1, and a third sub-pixel 14-3 having the third color filter 18-3 having a different color from the first color filter 18-1 and the second color filter 18-2.

The plurality of sub-pixels 14 are arranged in a repetitious sequence in a given row (e.g., 52 in FIGS. 2A-4B) among a plurality of rows in the matrix. A repetitious sequence is a sequence of sub-pixels that can be repeated. For example, the first sub-pixel 14-1 can have a first color filter 18-1 of blue such that a blue color (B) is transmitted, and being a blue sub-pixel (Pb); a second sub-pixel 14-2 can have a second color filter 18-2 of red such that a red color (R) is transmitted, being a red sub-pixel (Pr); and a third sub-pixel 18-3 can have a third color filter 18-3 of green, such that a green color (G) is transmitted, being a green sub-pixel (Pg); a fourth sub-pixel 18-4 can have the first color filter 18-1 of blue such that a blue color (B) is transmitted, being a blue sub-pixel (Pb); a fifth sub-pixel 14-5 can have the second color filter 18-2 of red such that a red color (R) is transmitted, being a red sub-pixel (Pr); and a sixth sub-pixel (not shown) can have the third color filter 18-3 of green, such that a green color (G) is transmitted, being a green sub-pixel (Pg). The sequence of the plurality of sub-pixels 14 in the given row can be repeated (e.g., B, R, G, B, R, G, B, R, G, B, R, G . . . ). As illustrated further herein, the three colors of sub-pixels (e.g., the red sub-pixel, the blue-sub-pixel, and the green sub-pixel) can be arranged in a variety of different repetitious sequences.

The plurality of drain lines 12 are formed between the plurality of sub-pixels 14. The plurality of drain lines 12 are arranged as a first type of drain line set 12-1 and/or a second type of drain line set 12-2. The first type of drain line set 12-1 includes only a single drain line positioned between two adjacent sub-pixels. The second type of drain line set 12-2 includes only two drain lines positioned between two adjacent sub-pixels. For example, the first type of drain line set 12-1 (e.g., a single drain line) may be formed between two adjacent sub-pixels in a given row. The two adjacent sub-pixels thereby may be separated by only the single drain line (e.g., 12-1). By way of another example, the second type of drain line set 12-2 (e.g., a double drain line; two drain lines) may be formed between two different adjacent sub-pixels in the given row. The two adjacent sub-pixels may be separated only by two drain lines (e.g., 12-2).

In some embodiments, a non-drain line region 34 is between two adjacent sub-pixels. The non-drain line region 34 is a region where no drain line is formed between two adjacent sub-pixels. In some embodiments, a sequenced drain line order can exist. That is, the appearance of the first or second type of drain line set 12-1, 12-2, or the non-drain line region 34, can be formed between adjacent sub-pixels in a given order, as described further herein.

As illustrated in FIG. 1, the second type of drain line set 12-2 is formed between the first sub-pixel 14-1 and the second sub-pixel 14-2. That is, two drain lines are formed between a blue sub-pixel (Pb) and a red sub-pixel (Pr) in the row. The first type of drain line set 12-1 is formed between the second sub-pixel 14-2 and the third sub-pixel 14-3. That is, a single drain line is formed between the red sub-pixel (Pr) and a green sub-pixel (Pg). A non-drain line region 34 is between the third sub-pixel 14-3 and a fourth sub-pixel 14-4 in the arrangement. That is, no drain line is formed between the red sub-pixel (Pr) and the green sub-pixel (Pg). The sequence of sub-pixels and/or the sequenced drain line order are repeated throughout the matrix rows.

The black matrix 20 (e.g., light shielding portion) is formed around each of the color filters 18 of the sub-pixels 14, which can block light from transmitting through the boundary between the respective color filters 18-1, 18-2, 18-3 of the plurality of sub-pixels 14. The black matrix 20 can have a different width associated with the plurality of drain lines 12. In an embodiment, a width 36-1 of the black matrix 20 overlapping the first type of drain line set 12-1 may be smaller than a width 36-2 of the black matrix 20 overlapping the second type of drain line set 12-2. That is, the width of a black matrix 20 overlapping a single drain line (e.g., 12-1) may be less than a width of a black matrix 20 overlapping a double-drain line (e.g., 12-2).

Additionally, or alternatively, the black matrix 20 can have a different width associated with the plurality of drain lines 12 and the non-drain line region 34. In an embodiment, a width 36-3 of the black matrix 20 overlapping the non-drain line region 34 may be smaller than a width 36-1 of the black matrix 20 overlapping the first type of drain line set 12-1. In other words, the width of a black matrix overlapping a non-drain region 34 may be less than a width of a black matrix 20 overlapping a single drain line (e.g., 12-1).

The black matrix 20 overlapping the non-drain line region 34 can form two adjacent sub-pixels among the plurality of sub-pixels 14 and/or the corresponding color filters 18 to be directly adjacent 38 to each other. Directly adjacent 38 is when the two adjacent sub-pixels among the plurality of sub-pixels 14 and/or the corresponding color filter 18 are not separated by the first type of drain line set 12-1, the second type of drain line set 12-2, or an intervening sub-pixel. Directly adjacent 38 sub-pixels 14 and/or corresponding color filters 18 may be in contact, such as two adjacent sub-pixels are in contact and/or two adjacent color filters 18 are in contact, without an intervening sub-pixel or plurality of drain lines 12.

As described further herein, different sequential arrangements of the plurality of sub-pixels 14 and/or different sequenced drain line orders within a given row of the arrangement can be formed to address color mixture and improve image quality of an LCD.

FIGS. 2A-4B illustrate different configurations of sub-pixels and drain lines in a liquid crystal display (LCD) device, according to three different embodiments of the disclosure. FIGS. 2A-4B depict the plurality of sub-pixels 14 arranged in the plurality of rows and columns. The arrangement of the plurality of sub-pixels 14 in the given row 52 among the plurality of rows have a sequenced order of the first sub-pixel adjacent to the second sub-pixel and the second sub-pixel adjacent to the third sub-pixel. In some embodiments, a sequence of three sub-pixels is repeated within the arrangement and in each of the plurality of rows. Alternatively, in some embodiments, a sequence of six sub-pixels 14 are repeated within the arrangement and in each of the plurality of rows.

Figure 2A:
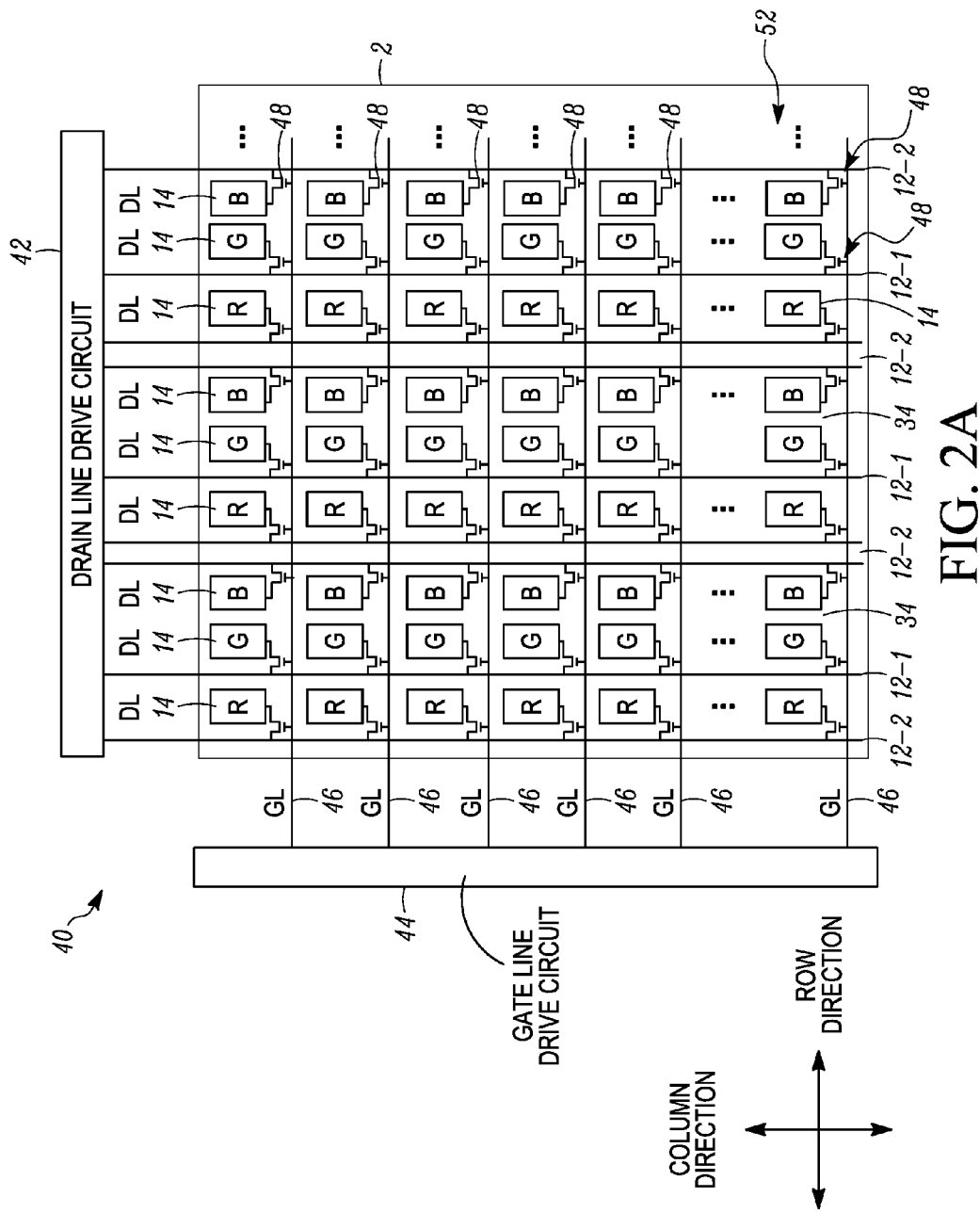
FIG. 2A illustrates a configuration of sub-pixels and drain lines in a liquid crystal display device, according to a first embodiment.

Each sub-pixel 14 in a given column, among the plurality of columns, includes a corresponding color filter 18, as discussed previously herein. The color filter 18 for each of the plurality of sub-pixels 14 in the given column has the same color, meaning the given column has a single color throughout the entire given column. For instance, as illustrated in FIG. 2A, the first column may have a red color filter (e.g., 18-1 in FIG. 1), a second column may have a green color filter (e.g., 18-2 in FIG. 1), a third column may have a blue color filter (e.g., 18-3 in FIG. 1), and so forth. While each row of the arrangement of the plurality of sub-pixels 14 may vary in color displayed, each column can have the single color filter 18 through the entire column of the arrangement.

The plurality of drain lines 12 and/or the non-drain line region 34 are formed between two adjacent sub-pixels among the plurality of sub-pixels 14 in the arrangement. The color mixture may correlate with an aperture ratio, which is influenced by the aperture width of the sub-pixel 14, and in general, as the aperture ratio increases, the color mixture is more likely to occur. Formation or non-formation of the plurality of drain lines 12 can reduce an aperture ratio of the sub-pixel, while suppressing deterioration of the display quality ascribable to color mixture. Arranging the plurality of sub-pixels 14 in particular arrangements, and/or formation of the plurality of drain lines 12, and/or non-drain regions 34 can decrease an aperture width of the sub-pixel 14, which can reduce color mixture.

FIG. 2A illustrates a configuration of sub-pixels and drain lines in a liquid crystal display (LCD) device 40, according to a first embodiment. The LCD 40 includes the display region 2 for displaying an image; drive circuits, such as a drain line drive circuit 42 and a gate line drive circuit 44, for driving the display region 2; a control circuit (not shown) for controlling the drive circuit; and a backlight (not shown) for illuminating the display panel with light from a back surface side.

As illustrated in the LCD 40 of FIG. 2A, the plurality of gate lines 46 are formed on the TFT substrate (e.g., the first substrate 4 in FIG. 1), so as to extend in a column direction and in row direction, respectively, as previously described herein. The thin film transistor 48 (TFT) is formed in the vicinity between each of the plurality of sub-pixels 14 and one drain line set among the plurality of drain lines 12.

For simplicity of this specification, aspects which are the same and were previously described will not be described in additional detail.

As illustrated in FIG. 2A, the arrangement of the plurality of sub-pixels 14 in a given row 52 among the plurality of rows includes a repetitious sequenced order of the first sub-pixel adjacent to the second sub-pixel and the second sub-pixel adjacent to the third sub-pixel. As shown in FIG. 2A, the repetitious sequenced order for the plurality of sub-pixels 14 in each row is the first sub-pixel being a red sub-pixel (R), the second sub-pixel being a green sub-pixel (G), and a third sub-pixel being the blue sub-pixel (B). The sequence of three sub-pixels (e.g., R, G, B) is repeated within the arrangement and in each of the plurality of rows.

As illustrated by FIG. 2A, the plurality of sub-pixels 14 in the arrangement include the plurality of drain lines 12 formed in the following manner: $R_1, G_N, B_2, R_1, G_N, B_2$, and so forth, where 1 indicates a single drain line (e.g., 12-1), 2 indicates a double drain line (e.g., 12-2), and N indicates no drain line.

The first sub-pixel is interposed between the first type of drain line set 12-1 and the second type of drain line set 12-2, while the second sub-pixel is interposed between the first type of drain line set 12-1 and a non-drain line region 34. FIG. 2A shows the first (red) sub-pixel interposed between the first type of drain line set 12-1 (e.g., a single drain line) to the right of the first sub-pixel (R), and the second type of drain line set 12-2 (e.g., double drain line) to the left of the first sub-pixel (R). The second sub-pixel (G) is shown to be interposed between the first type of drain line set 12-1 and the non-drain line region 34, while the non-drain line region 34 is formed between the second sub-pixel (G) and the third sub-pixel (B). As previously described herein, the non-drain line region 34 is a region where no drain line is formed between two adjacent sub-pixels.

The sequence of the three sub-pixels (e.g., R, G, B) and the drain line order (e.g. second type of drain line set 12-2, first type of drain line set 12-1, and non-drain line region 34) is repeated within the arrangement and in each of the plurality of rows. For example, the second type of drain line set 12-2 is formed between the third (blue) sub-pixel (B) and the first (red) sub-pixel (R) and repeats throughout the arrangement.

FIG. 2A further illustrates the third sub-pixel is interposed between the second type of drain line set 12-2 and the non-drain line region 34. For example, the third sub-pixel (B) interposed between the non-drain line region 34 to the left, and the second type of drain line set 12-2 (e.g., double drain line) to the right.

Since the retina of a human eye is less sensitive to color mixing with the green color than in other colors (e.g., blue color, red color, etc.), by sequencing the plurality of pixels in a particular arrangement and/or forming a plurality of drain lines 12 in the arrangement to account for placement and separation of the blue and red sub-pixels, image distortion from color mixing may be avoided. In particular, forming the second type of drain line set 12-2 between the particular two sub-pixels may increase a width of a black matrix (e.g., illustrated as 20 in FIG. 1) between the corresponding color filters 18 and increasing separation between the respective color filters (e.g., illustrated as 18-2, 18-1 in FIG. 1), which may decrease light leakage and/or color mixture. Increasing spacing between the color filters (e.g., 18 in FIG. 1) by the formation of the plurality of drain lines 12 may increase the aperture width associated with the respective sub-pixel, which can decrease the occurrence of light leaking through an adjacent color filter that may cause color mixture, thereby improving display image quality.

Figure 2B:
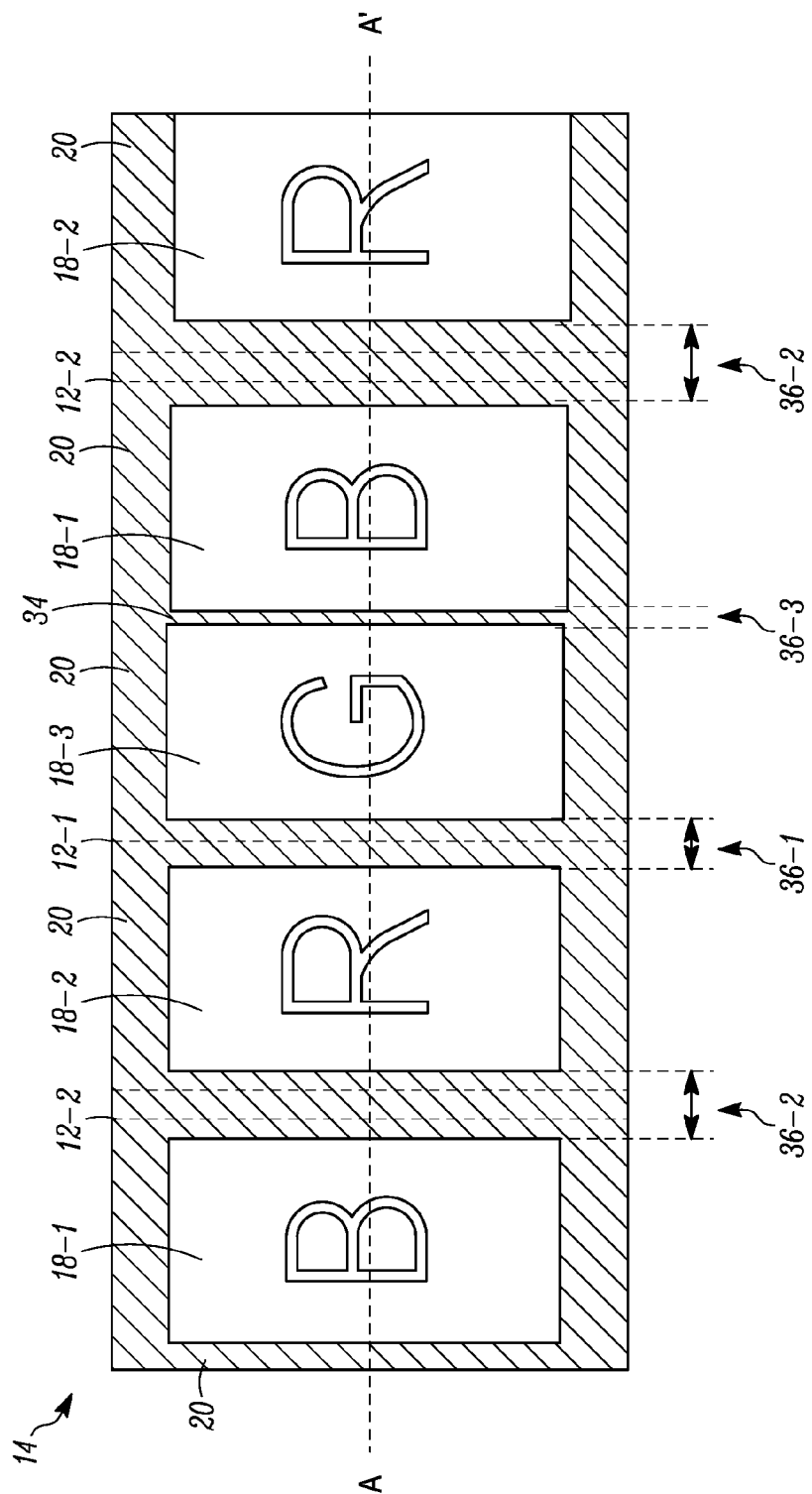
FIG. 2B illustrates a plan view of a configuration of sub-pixels, according to the first embodiment.

FIG. 2B illustrates a plan view of a configuration of sub-pixels, according to the first embodiment. FIG. 2B depicts a cross sectional view along line A and A' in FIG. 1 according to the first embodiment.

As illustrated in FIG. 2B, the plurality of sub-pixels 14 are arranged in a repetitious sequence with the plurality of drain lines 12 and/or a non-drain line region 34 formed between two adjacent sub-pixels among the plurality of sub-pixels 14 in the arrangement. As previously described with respect to FIG. 1, the black matrix 20 is formed around each of the color filters 18 of the sub-pixels 14, which can block light from transmitting through the boundary between the respective color filters 18-1, 18-2, 18-3 of the plurality of sub-pixels 14.

The black matrix 20 can have a different width 36 associated with the plurality of drain lines 12. As illustrated in FIG. 2B, the width 36-1 of the black matrix 20 overlapping the first type of drain line set 12-1 is less than the width 36-2 of the black matrix 20 overlapping the second type of drain line set 12-2. For example, the width 36-1 of the black matrix 30 overlapping the first type of drain line set 12-2 in FIG. 2B may be 10 micrometers, while the width 36-2 of the black matrix 20 overlapping the second type of drain line set 12-2 may be 16 micrometers (e.g., 10 µm<16 µm). Thus, the width 36-1 of the black matrix 20 overlapping a single drain line (e.g., 12-1) is less than a width 36-2 of the black matrix 20 overlapping the double-drain line (e.g., 12-2) (e.g., 10 micrometers is less than 16 micrometers).

Additionally, the black matrix 20 has a different width associated with the plurality of drain lines 12 and the non-drain line region 34. As illustrated in FIG. 2B, the width 36-3 of the black matrix 20 overlapping the non-drain line region 34 is less than the width 36-1 of the black matrix 20 overlapping the first type of drain line set 12-1. For example, the width 36-3 of the black matrix 20 overlapping the non-drain line region 34 illustrated in FIG. 2B may be 3 micrometers, while the width 36-1 of the black matrix 20 overlapping the first type of drain line set 12-1 may be 10 micrometers. (e.g., 3 μm<10 μm). Thus, the width of a black matrix overlapping a non-drain region 34 is less than a width of a black matrix 20 overlapping a single drain line (e.g., 12-1) (e.g., 3 micrometers is less than 10 micrometers).

Additionally, in some embodiments, an interval between the red sub-pixel 18-2 and the blue sub-pixel 18-1 can be spaced a distance apart so as to prevent color mixing between red and blue lights, which is the most noticeable color mixing observed by viewers. The spacing of the red sub-pixel 18-2 and the blue sub-pixel 18-1 can decrease and/or prevent color mixing between the two pixels, thereby increasing the quality of the viewed image.

By way of example, as illustrated in FIG. 2B, the width 36 between sub-pixels 18 can vary and a total width of the black matrix 20 between the red sub-pixel 18-2 and the green sub-pixel 18-3; the green sub-pixel 18-3 and the blue sub-pixel 18-1; and the blue sub-pixel 18-1 and the red sub-pixel 18-2 can be 29 micrometers (e.g., 10 μm+3 μm+16 μm=29 μm). The variation of widths may be advantageous to provide a larger interval between particular sub-pixels (e.g., red sub-pixels 18-2 and blue sub-pixels 18-1) or smaller interval between other particular sub-pixels (e.g., green sub-pixel 18-3 and red or blue sub-pixels 18-2, 18-1) in an arrangement to account for different possible causes of color mixing. That is, since red and blue color mixing is more noticeable to a viewer than green and red or green and blue color mixing, more space may be provided between the red sub-pixel 18-2 and the blue sub-pixel 18-1, and less space may be provided between the green sub-pixel 18-3 and either the red or blue sub-pixels 18-2, 18-1, via formations of the plurality of drain lines 12.

Figure 2C:
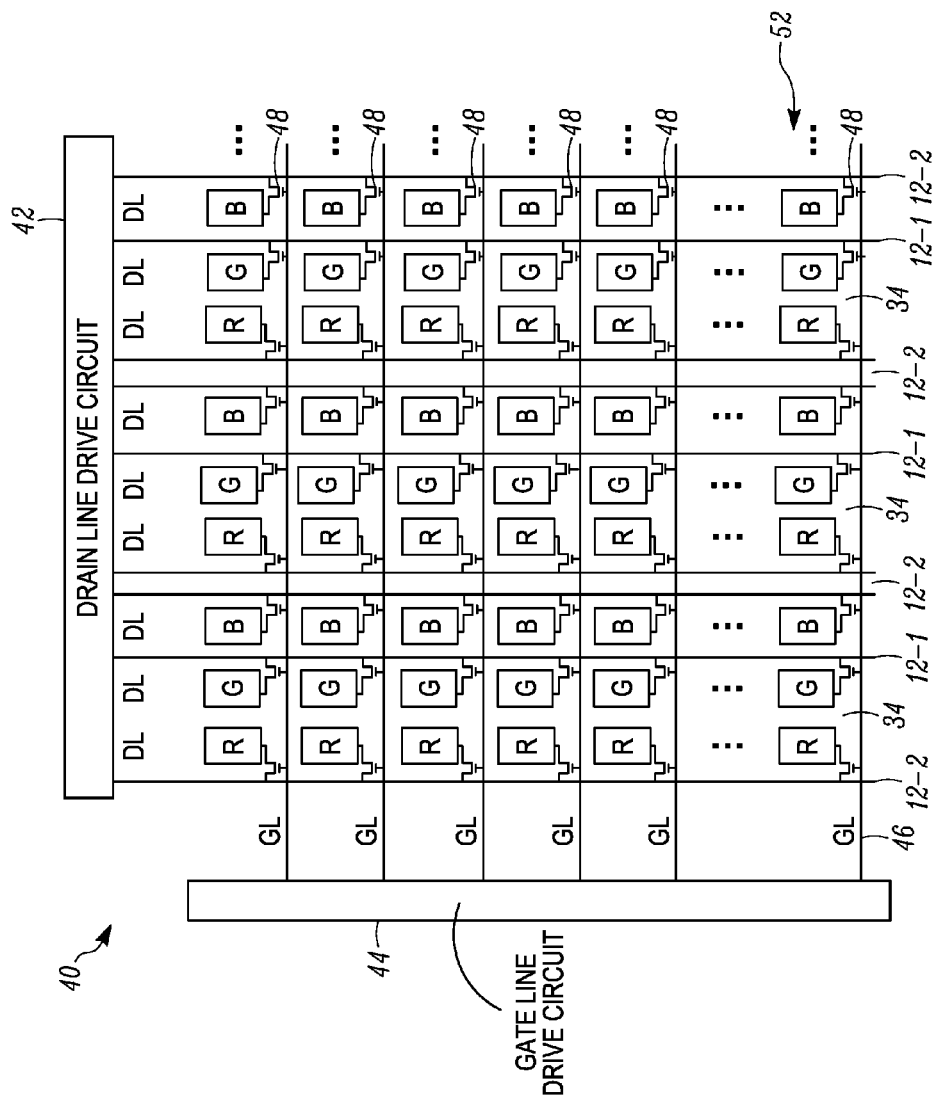
FIG. 2C illustrates another configuration of sub-pixels and drain lines in a liquid crystal display device, according to the first embodiment.
Figure 5:
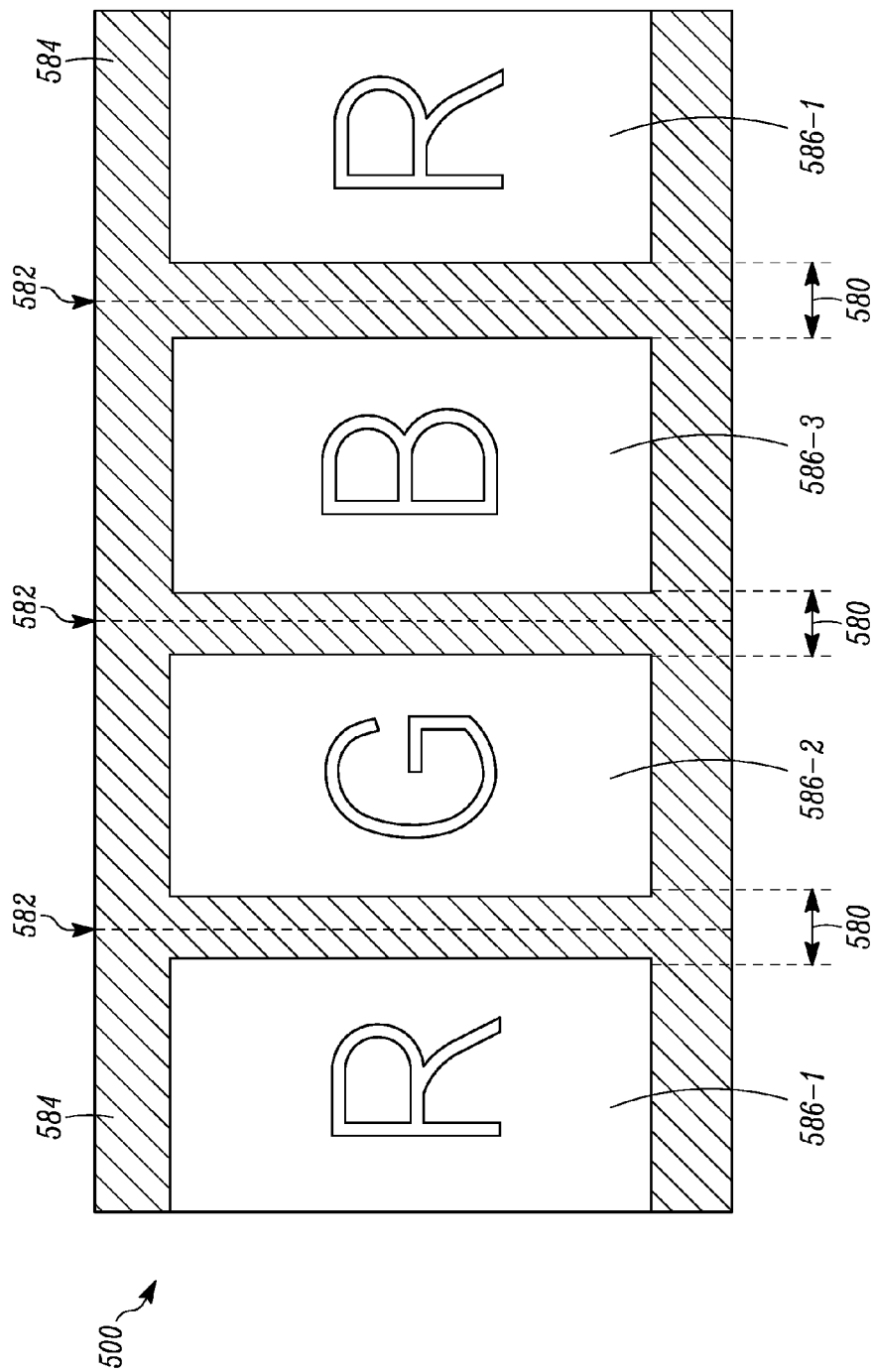
FIG. 5 illustrates a plan view of a configuration of sub-pixels, according to a prior art embodiment.

In contrast to FIGS. 2A and 2B, previous solutions may only have a single drain line formed between adjacent pixels, each single drain line having a uniform width. FIG. 5 illustrates a plan view of a configuration of sub-pixels 500, according to a prior art embodiment. As illustrated in FIG. 5, the single drain line 582 depicted by a previous solution is static in width 580 with no variation. That is, the width 580 of the black matrix 584 associated with each of the single drain lines 582 are the same. For example, a plurality of sub-pixels 500 may be arranged such that each of the single drain lines 582 formed there-between each have a width 580 of 10 micrometers. Although the single drain line 582 may appear three times between different adjacent sub-pixels in a row, as illustrated in FIG. 5, each width 580 for each of the three single drain lines 580 is uniform (e.g., 10 μm), for a total width of 30 micrometers. That is, three single drain lines 582 with a uniform width 580, which are formed within the plurality of pixels 500 can total 30 micrometers (e.g., 10 μm+10 μm+10 μm=30 μm). By way of further example, the total width 580 of the black matrix 584 between the red sub-pixel 586-1 and the green sub-pixel 586-2; the green sub-pixel 586-2 and the blue sub-pixel 586-3; and the blue sub-pixel 586-3 and the red sub-pixel 586-1, as illustrated in FIG. 5, may be 30 micrometers. As such, regardless of the particular sub-pixel/color filter, the interval (e.g., space) between particular sub-pixels is a uniform width, which can cause an increase in color mixing, a decrease in image quality, and an increase in power consumption. FIG. 2C illustrates another configuration of sub-pixels and drain lines in a liquid crystal display device, according to the first embodiment.

As illustrated in FIG. 2C, the arrangement of the plurality of sub-pixels 14 in the given row 52 among the plurality of rows includes a repetitious sequenced order of the first sub-pixel adjacent to the second sub-pixel and the second sub-pixel adjacent to the third sub-pixel. As shown in FIG. 2C, the repetitious sequenced order for the plurality of sub-pixels 14 in each row is the first sub-pixel being a red sub-pixel (R), the second sub-pixel being a green sub-pixel (G), and a third sub-pixel being the blue sub-pixel (B). The sequence of three sub-pixels (e.g., R, G, B) is repeated within the arrangement and in each of the plurality of rows.

As illustrated by FIG. 2C, the plurality of sub-pixels 14 in the arrangement include the plurality of drain lines 12 formed in the following manner: $R_N$, $G_1$, $B_2$, $R_N$, $G_1$, $B_2$, and so forth, where 1 indicates a single drain line (e.g., 12-1), 2 indicates a double drain line (e.g., 12-2), and N indicates no drain line.

The first sub-pixel is interposed between the second type of drain line set 12-2 and the non-drain line region 34, while the second sub-pixel is interposed between the non-drain line region and the first type of drain line set 12-1. FIG. 2C shows the first (red) sub-pixel interposed between the second type of drain line set 12-2 (e.g., a double drain line) to the left of the first sub-pixel (R), and the non-drain line region 34 (e.g., no drain line) to the right of the first sub-pixel (R). The second sub-pixel (G) is shown to be interposed between the non-drain line region 34 and the first type of drain line set 12-1, while, the second type of drain line set 12-2 is formed between the third sub-pixel (B) the first sub-pixel (R).

The sequence of the three sub-pixels (e.g., R, G, B) and the drain line order (e.g. second type of drain line set 12-2, non-drain line region 34, and first type of drain line set 12-1) is repeated within the arrangement and in each of the plurality of rows. For example, the second type of drain line set 12-2 is formed between the third (blue) sub-pixel (B) and the first (red) sub-pixel (R), while the non-drain line region is formed between the second (green) sub-pixel and the third (blue) sub-pixel and repeats throughout the arrangement.

FIG. 2C further illustrates the third sub-pixel is interposed between the second type of drain line set 12-2 and the first type of drain line set 12-1. For example, the third sub-pixel (B) interposed between the first type of drain line set 12-1 to the left, and the second type of drain line set 12-2 (e.g., double drain line) to the right.

FIGS. 3A-3D illustrate configuration of sub-pixels and drain lines in a liquid crystal display device, according to a second embodiment. For simplicity of this specification, aspects which are the same and were previously described will not be described in additional detail.

FIGS. 3A-3D depict an arrangement of the plurality of sub-pixels 14 having a sequential order of red (first) sub-pixel, green (second) sub-pixel, blue (third) sub-pixel, blue (third) sub-pixel, green (second) sub-pixel, red (first) sub-pixel, red (first) sub-pixel, green (second) sub-pixel, and so forth (e.g., R, G, B, B, G, R, R, G, B, . . . ).

The sequenced order of the plurality of sub-pixels 14 in a given row 52 among the plurality of rows in the arrangement have a repetitious appearance of the first sub-pixel in which two first sub-pixels are arranged adjacent to each other. In other words, the repetitious appearance is when a same colored sub-pixel occurs as adjacent sub-pixels. As shown in FIGS. 3A-3D, the first sub-pixel (red) has a repetitious appearance in the arrangement, which shows two red sub-pixels appearing adjacent to each other.

Additionally, the repetitious appearance of the third sub-pixel can occur in which two third sub-pixels are arranged adjacent to each other. As shown in FIGS. 3A-3D, the third sub-pixel (blue) has a repetitious appearance in the arrangement, which shows two blue sub-pixels appearing adjacent to each other.

A singular appearance of the second sub-pixel occurs when the first sub-pixel and the third sub-pixel have repetitious appearances in the arrangement. In these instances, the second sub-pixel may be adjacent to only the first sub-pixel and the third sub-pixel. For example, as illustrated in FIGS. 3A-3D, the red sub-pixel (e.g., first sub-pixel) and the blue sub-pixel (e.g., third sub-pixel) each have repetitious appearances in the given row 58 (e.g., red-red and blue-blue adjacent sub-pixels). The green sub-pixel (e.g., second sub-pixel) is adjacent to the repetitious red and blue sub-pixels, separating the repetitious sub-pixels.

Although FIGS. 3A-3D depict an identical arrangement of the plurality of sub-pixels 14 in a sequential order, the formation of the plurality of drain lines 12 and non-drain line regions differ, as discussed further herein.

Figure 3A:
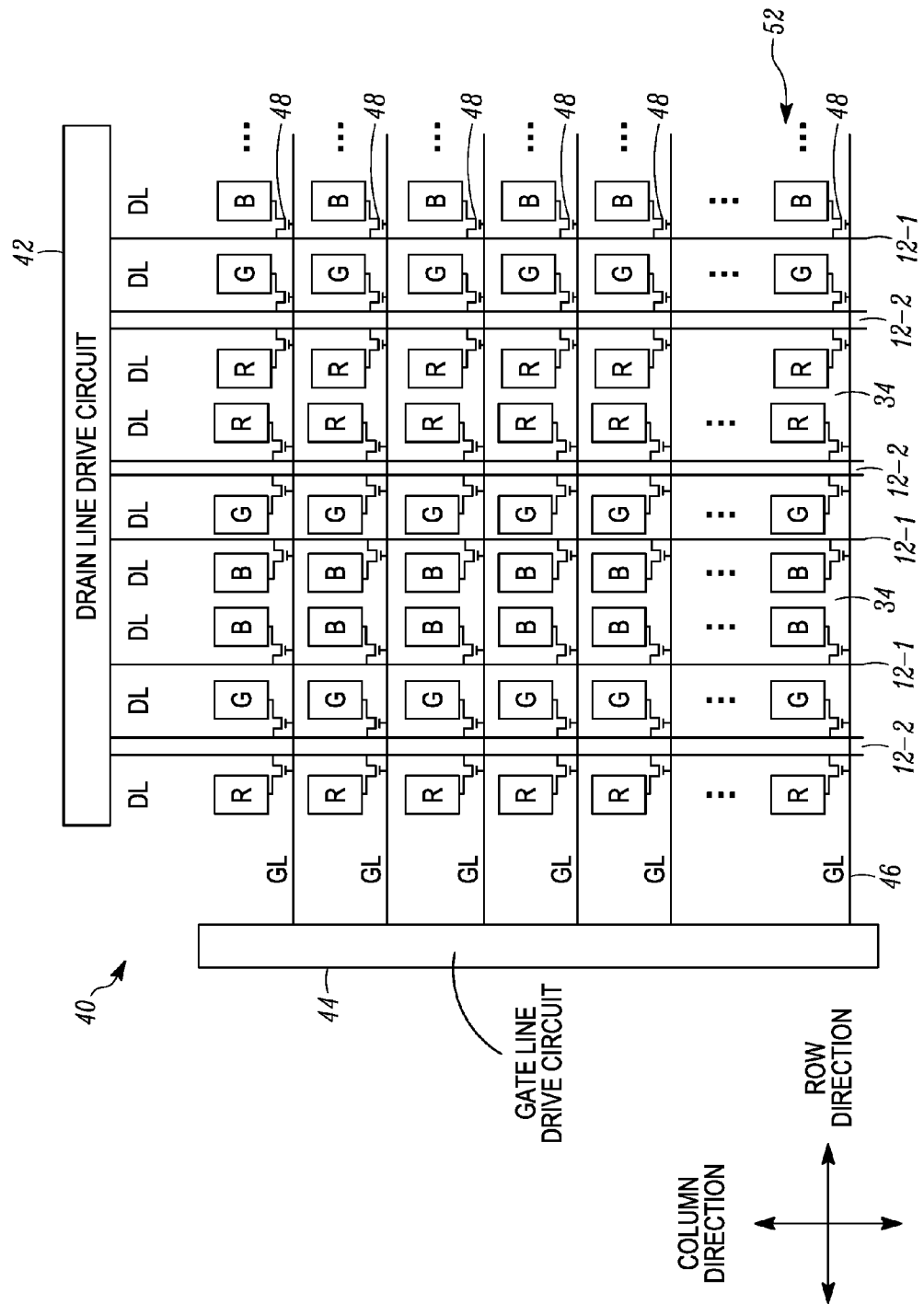
FIG. 3A illustrates one configuration of sub-pixels and drain lines in a liquid crystal display device, according to a second embodiment.

FIG. 3A illustrates one configuration of sub-pixels and drain lines in a liquid crystal display device, according to a second embodiment.

As illustrated by FIG. 3A, the plurality of sub-pixels 14 in the arrangement include the plurality of drain lines 12 formed in the following manner: $R_2$, $G_1$, $B_0$, $B_1$, $G_2$, $R_N$, and so forth, where 1 indicates a single drain line (e.g., 12-1), 2 indicates a double drain line (e.g., 12-2), and N indicates no drain line.

The embodiment of FIG. 3A illustrates the repetitious appearance of the first sub-pixel and the repetitious appearance of the third sub-pixel in a given row among the plurality of rows are separated from each other by the first type of drain line set 12-1, the singular appearance of the third sub-pixel, and the second type of drain line set 12-2. For example, the green sub-pixel (e.g., the second sub-pixel in the sequenced order of the plurality of pixels) separates the repetitious appearance of the blue sub-pixel (e.g., the third sub-pixel) and the red sub-pixel (e.g., the first sub-pixel). That is, the green sub-pixel separates the two repetitious appearance of the two different sub-pixels in the arrangement. Additionally, the green sub-pixel includes a single drain line (e.g., 12-1) and a double drain line (e.g., 12-2) on either side. The double drain line (e.g., 12-2) separates the green sub-pixel from the red sub-pixels, while the single drain line (e.g., 12-1) separates the green sub-pixel from the blue sub-pixels.

FIG. 3A depicts a drain line order of the green sub-pixel (e.g., the second sub-pixel) being separated from the red sub-pixel (e.g., the first sub-pixel) by the second type of drain line set 12-2, while the first type of drain line set 12-1 separates the green sub-pixel (e.g., the second sub-pixel) from the blue sub-pixel (e.g., third sub-pixel) in the arrangement. As such, the repetitious appearances of the first and the third sub-pixels in the arrangement are separated by three components: the second sub-pixel, the first type of drain line set 12-1, and the double drain line set 12-2.

Figure 3B:
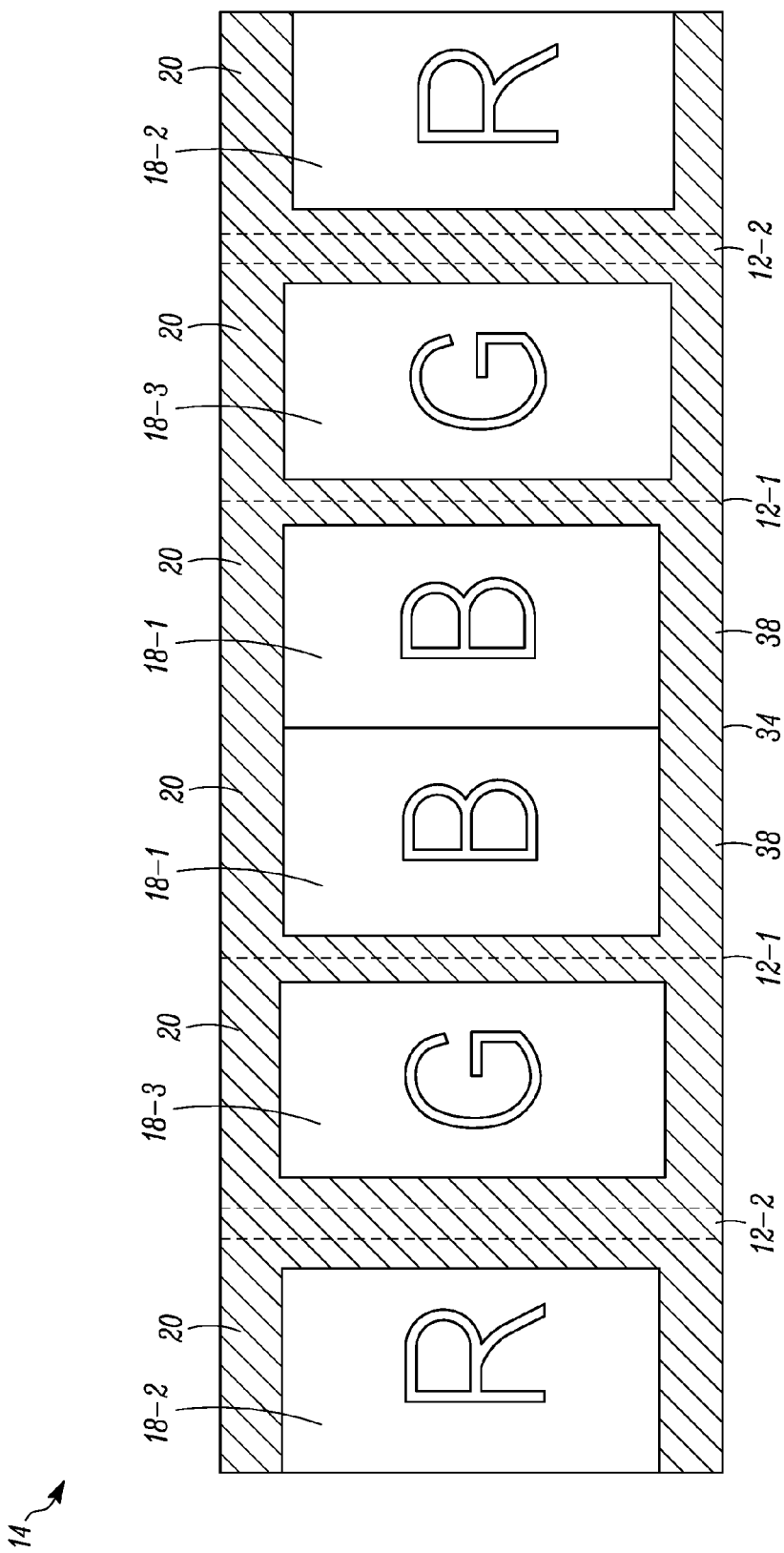
FIG. 3B illustrates a plan view of a configuration of sub-pixels, according to the second embodiment.

FIG. 3B illustrates a plan view of a configuration of sub-pixels, according to the second embodiment.

As illustrated in FIG. 3B, the plurality of sub-pixels 14 are arranged in a repetitious sequence as described with respect to FIG. 3A (e.g., $R_2$, $G_1$, $B_0$, $B_1$, $G_2$, $R_N$, and so forth) with the plurality of drain lines 12 and/or a non-drain line region 34 formed between two adjacent sub-pixels among the plurality of sub-pixels 14 in the arrangement.

As previously described with respect to FIG. 1, the black matrix 20 is formed around each of the color filters 18 of the sub-pixels 14, which can block light from transmitting through the boundary between the respective color filters 18-1, 18-2, 18-3 of the plurality of sub-pixels 14. As illustrated in FIG. 3B, the black matrix 20 overlapping the non-drain line region 34 can form two adjacent sub-pixels among the plurality of sub-pixels 14 and/or the corresponding color filters 18 to be directly adjacent 38 to each other. Directly adjacent 38 is when the two adjacent sub-pixels among the plurality of sub-pixels 14 and/or the corresponding color filter 18 are not separated by the first type of drain line set 12-1, the second type of drain line set 12-2, or an intervening sub-pixel. For example, as the third sub-pixel 14 with a blue color filter 18-1 is directly adjacent to a second third sub-pixel 14 with a blue color filter 18-1 with a non-drain line region 34 formed there-between. The adjacent third sub-pixels 14 may are directly adjacent to each other since neither of the plurality of drain lines 12 or an intervening sub-pixel (e.g., a first or second sub-pixel) is there-between.

The directly adjacent 38 sub-pixels 14 and/or corresponding color filters 18 may be in contact, such as two adjacent sub-pixels are in contact and/or two adjacent color filters 18 are in contact, without an intervening sub-pixel or plurality of drain lines 12. For example, as illustrated in FIG. 3B, the black matrix 20 surrounds the directly adjacent 38 sub-pixels 14 with blue color filters 18-1. However, the black matrix 20 is not between the sub-pixels 14 with the blue color filters 18-1 because they are directly adjacent 38.

Figure 3C:
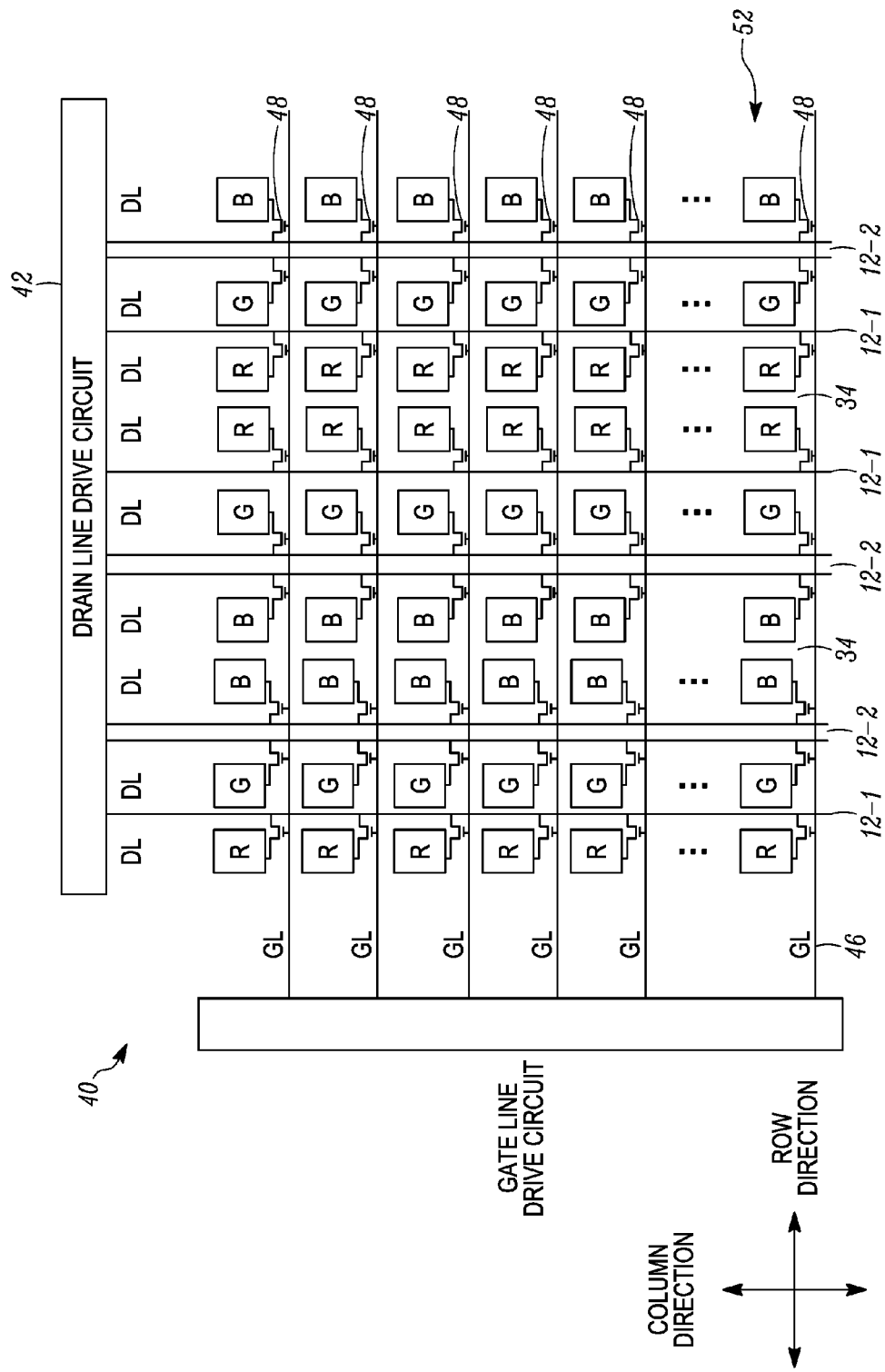
FIG. 3C illustrates another configuration of sub-pixels and drain lines in a liquid crystal display device, according to the second embodiment.

FIG. 3C illustrates another configuration of sub-pixels and drain lines in a liquid crystal display device, according to the second embodiment.

As illustrated by FIG. 3C, the plurality of sub-pixels 14 in the arrangement include the plurality of drain lines 12 formed in the following manner: $R_1$, $G_2$, $B_0$, $B_2$, $R_N$, and so forth, where 1 indicates a single drain line (e.g., 12-1), 2 indicates a double drain line (e.g., 12-2), and N indicates no drain line.

The embodiment of FIG. 3C illustrates the repetitious appearance of the first sub-pixel and the repetitious appearance of the third sub-pixel in a given row among the plurality of rows are separated from each other by the first type of drain line set 12-1, the singular appearance of the third sub-pixel, and the second type of drain line set 12-2.

However, FIG. 3C depicts a different drain line order than that of FIG. 3A. The green sub-pixel (e.g., the second sub-pixel) is separated from the red sub-pixel (e.g., the first sub-pixel) by the first type of drain line set 12-1, while the second type of drain line set 12-2 separates the green sub-pixel (e.g., the second sub-pixel) from the blue sub-pixel (e.g., third sub-pixel) in the arrangement. That is, the type of drain line set separating the green pixel (e.g., the second pixel) from the first and third sub-pixels are different from FIG. 3A. As such, the repetitious appearances of the first and the third sub-pixels in the arrangement are separated by three components: the second sub-pixel, the first type of drain line set 12-1, and the double drain line set 12-2.

FIGS. 3A and 3C further illustrate the sequenced drain line order have the non-drain line region 34 formed between two of the first type of drain line sets 12-1. For example, the plurality of sub-pixels 14 arrangement can have a sequenced drain line order in which the non-drain line region 34 is formed between two single drain lines (12-1). As illustrated in FIG. 3A, the non-drain line region 34 is formed between repetitious appearance of the blue sub-pixels (e.g., third sub-pixels) in the arrangement, which is between two of the first type of drain line sets 12-1 on either side of the repetitious appearance. As illustrated in FIG. 3A, the non-drain line region 34 is also formed between the repetitious appearance of the red sub-pixels (e.g., first sub-pixels) in the arrangement, which is between two of the second type of drain line sets 12-2 on either side of the repetitious appearance.

Additionally, FIG. 3C depicts the non-drain line region formed between the repetitious appearance of the red sub-pixels (e.g., the first sub-pixels) which is between two of the first type of drain line sets 12-1. As illustrated in FIG. 3C, the non-drain line region 34 is also formed between the repetitious appearance of the blue sub-pixels (e.g., third sub-pixels) in the arrangement, which is between two of the second type of drain line sets 12-2 on either side of the repetitious appearance.

Figure 3D:
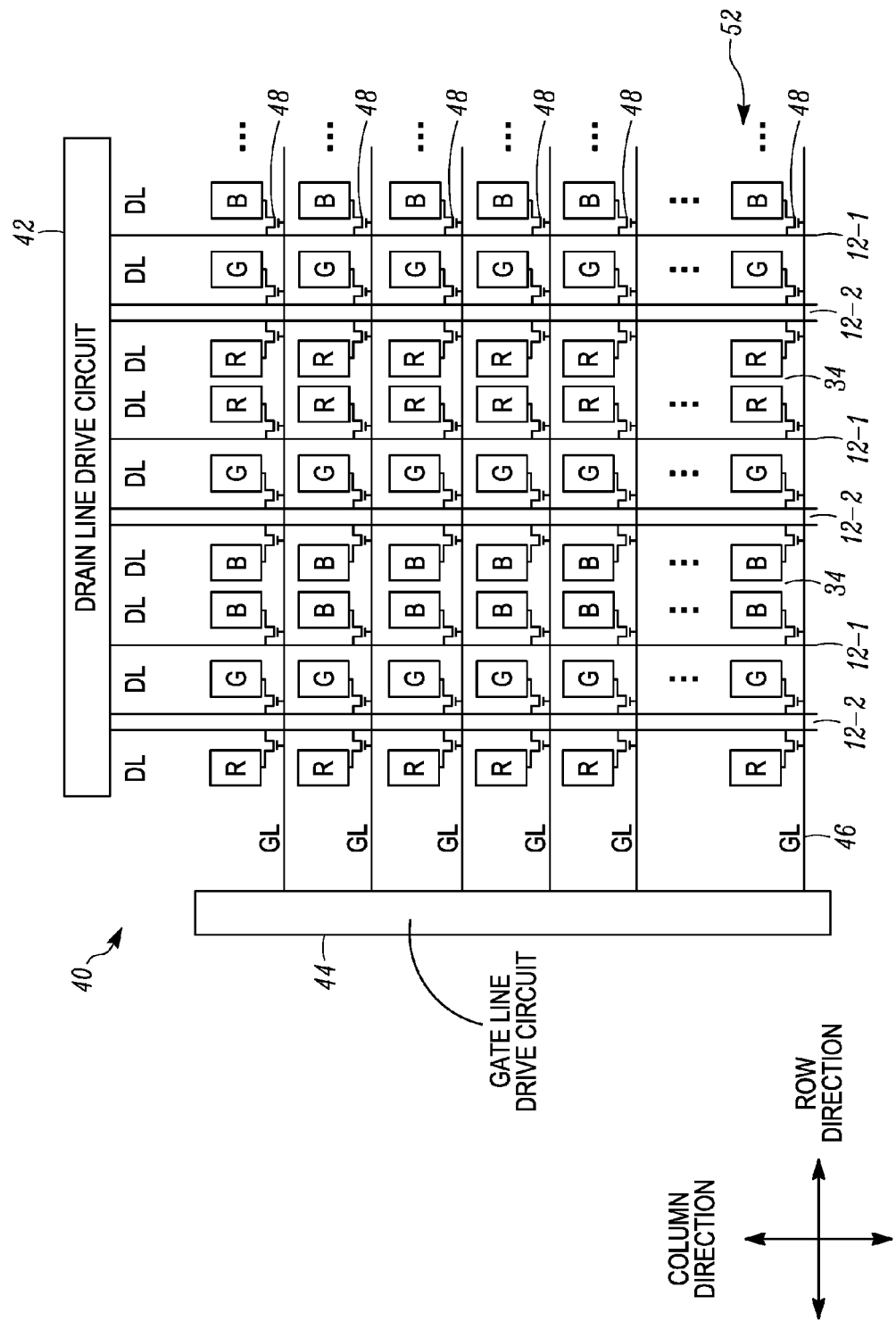
FIG. 3D illustrates yet another configuration of sub-pixels and drain lines in a liquid crystal display device, according to the second embodiment.

FIG. 3D illustrates yet another configuration of sub-pixels and drain lines in a liquid crystal display device, according to the second embodiment.

As illustrated by FIG. 3D, the plurality of sub-pixels 14 in the arrangement include the plurality of drain lines 12 formed in the following manner: $R_2, G_1, B_0, B_2, G_1, R_N$, and so forth, where 1 indicates a single drain line (e.g., 12-1), 2 indicates a double drain line (e.g., 12-2), and N indicates no drain line.

The embodiment of FIG. 3D illustrates the repetitious appearance of the first sub-pixel and the repetitious appearance of the third sub-pixel in a given row among the plurality of rows are separated from each other by the first type of drain line set 12-1, the singular appearance of the third sub-pixel, and the second type of drain line set 12-2.

However, FIG. 3D depicts a different drain line order than that of FIGS. 3A and 3C. While FIGS. 3A and 3C depicts the green sub-pixel (e.g., the second sub-pixel) separated by either the first or the third sub-pixel by the second type of drain line set 12-2 each time the particular pixel color occurs (e.g., red or blue), FIG. 3D depicts the green sub-pixel (e.g., the second sub-pixel) is separated from the red sub-pixel (e.g., the first sub-pixel) or the blue sub-pixel (e.g., the third sub-pixel) by either the first type of drain line set 12-1 or the second type of drain line set 12-2 in the arrangement. In this embodiment, the first type of drain line set 12-1 is formed between the first sub-pixel and either the second sub-pixel or the third sub-pixel. That is, the type of drain line set separating the green pixel (e.g., the second pixel) from the first and/or third sub-pixels can be either a single drain line (e.g., 12-1) or a double drain line (e.g., 12-2). As such, the repetitious appearances of the first and the third sub-pixels in the arrangement are separated by three components: the second sub-pixel, the first type of drain line set 12-1, and the double drain line set 12-2.

Additionally, as previously mentioned herein with respect to FIG. 2A, the arrangement of the plurality of drain lines 12 includes a sequenced drain line order of the first type of drain line set 12-1, the second type of drain line set 12-2, and a non-drain line region 34. As depicted in FIG. 3D, the plurality of drain lines 12 are formed in a sequence of a second type of drain line set 12-2, the first type of drain line set 12-1, and a non-drain line region 34. In other words, the sequenced drain line order form drain lines between two adjacent sub-pixels in a particular order throughout the plurality of sub-pixels 14 arrangement (e.g., two drain lines, one drain line, no drain line, repeat).

By forming a plurality of drain lines and/or a non-drain line region between two adjacent sub-pixels among the plurality of sub-pixels 14 in a particular arrangement, color mixture can be decreased and/or the image quality of the LCD device can be improved. As the plurality of drain lines 12 can be made of metal and/or have a width of about 4 micrometers or more, the drain lines can be used to block light from adjacent sub-pixels, thereby decreases light leakage. Decreasing light leakage by using different drain line orders and/or sub-pixel arrangements may reduce and/or eliminate color mixture in a displayed image.

Figure 4A:
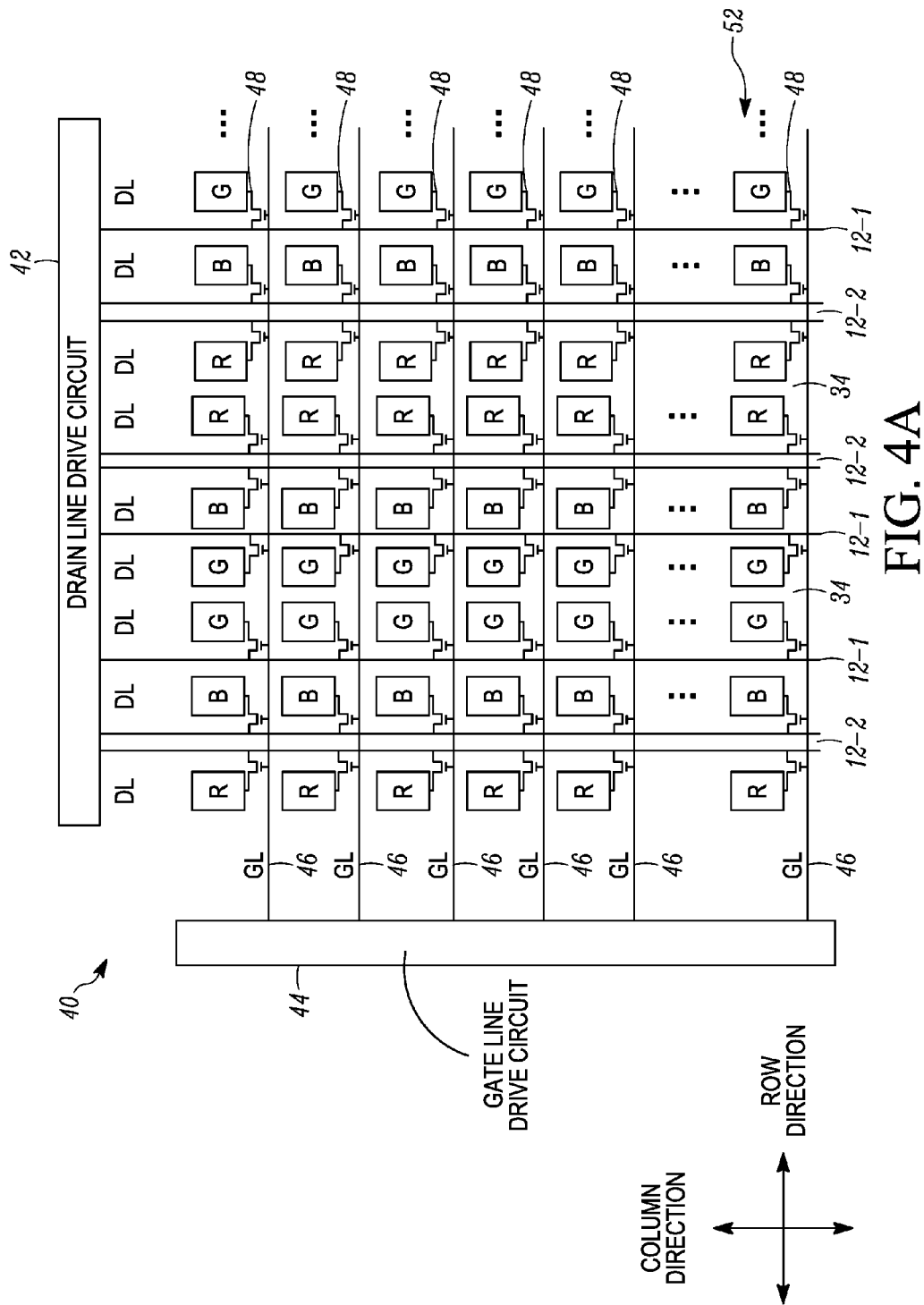
FIG. 4A illustrates one configuration of sub-pixels and drain lines in a liquid crystal display device, according to a third embodiment.

FIG. 4A illustrates a configuration of pixels and drain lines in a liquid crystal display device, according to a third embodiment. For simplicity of this specification, aspects which are the same and were previously described will not be described in additional detail.

As illustrated by FIG. 4A, the plurality of sub-pixels 14 in the arrangement include the plurality of drain lines 12 formed in the following manner: $R_2, B_1, G_0, G_1, B_2, R_N$, and so forth, where 1 indicates a single drain line (e.g., 12-1), 2 indicates a double drain line (e.g., 12-2), and N indicates no drain line.

In this embodiment, the first sub-pixel is a red sub-pixel having a red color filter, the second sub-pixel is a blue sub-pixel having a blue color filter, and the third sub-pixel is a green sub-pixel having a green color filter. FIG. 4A depicts an arrangement of the plurality of sub-pixels 14 having a sequential order of red sub-pixel (first sub-pixel), blue sub-pixel (second sub-pixel), green sub-pixel (third sub-pixel), green sub-pixel (third sub-pixel), blue sub-pixel (second sub-pixel), red sub-pixel (first sub-pixel), in the arrangement and so forth (e.g., R, B, G, G, B, R, . . . ). The sequenced order of the plurality of sub-pixels 14 in a given row 52 among the plurality of rows in the arrangement has a repetitious appearance of the first sub-pixel and the third sub-pixel (e.g., the green sub-pixel and the red sub-pixel, respectively). A singular appearance of the second sub-pixel (e.g., the blue sub-pixel) occurs when the first sub-pixel and the third sub-pixel have repetitious appearances. In these instances, the second sub-pixel may be adjacent to only the first sub-pixel and the third sub-pixel. For example, the red sub-pixel and the green sub-pixel have a repetitious appearance while the blue sub-pixel has a singular appearance.

The repetitious appearance of the first sub-pixel and the repetitious appearance of the third sub-pixel in a given row among the plurality of rows are separated from each other by the first type of drain line set 12-1, the singular appearance of the second sub-pixel, and the second type of drain line set 12-2. For example, as shown in FIG. 4A, the blue sub-pixel (e.g., the second sub-pixel), and the plurality of drain lines 12 separate the two adjacent red sub-pixels (e.g., repetitious appearance of first sub-pixels) and the two adjacent green sub-pixels (e.g., repetitious appearance of the third sub-pixels).

The sequenced drain line order in the arrangement has the non-drain line region 34 formed between two of the first type of drain line sets 12-1 and the sequenced drain line order has the non-drain line region 34 formed between two of the second type of drain line sets 12-2. The second type of drain line set 12-2 is formed between the first sub-pixel and the second sub-pixels. That is, as depicted by FIG. 4A, the second type of drain line set 12-2 (e.g., double drain line) is formed between the red and the blue sub-pixels.

Figure 4B:
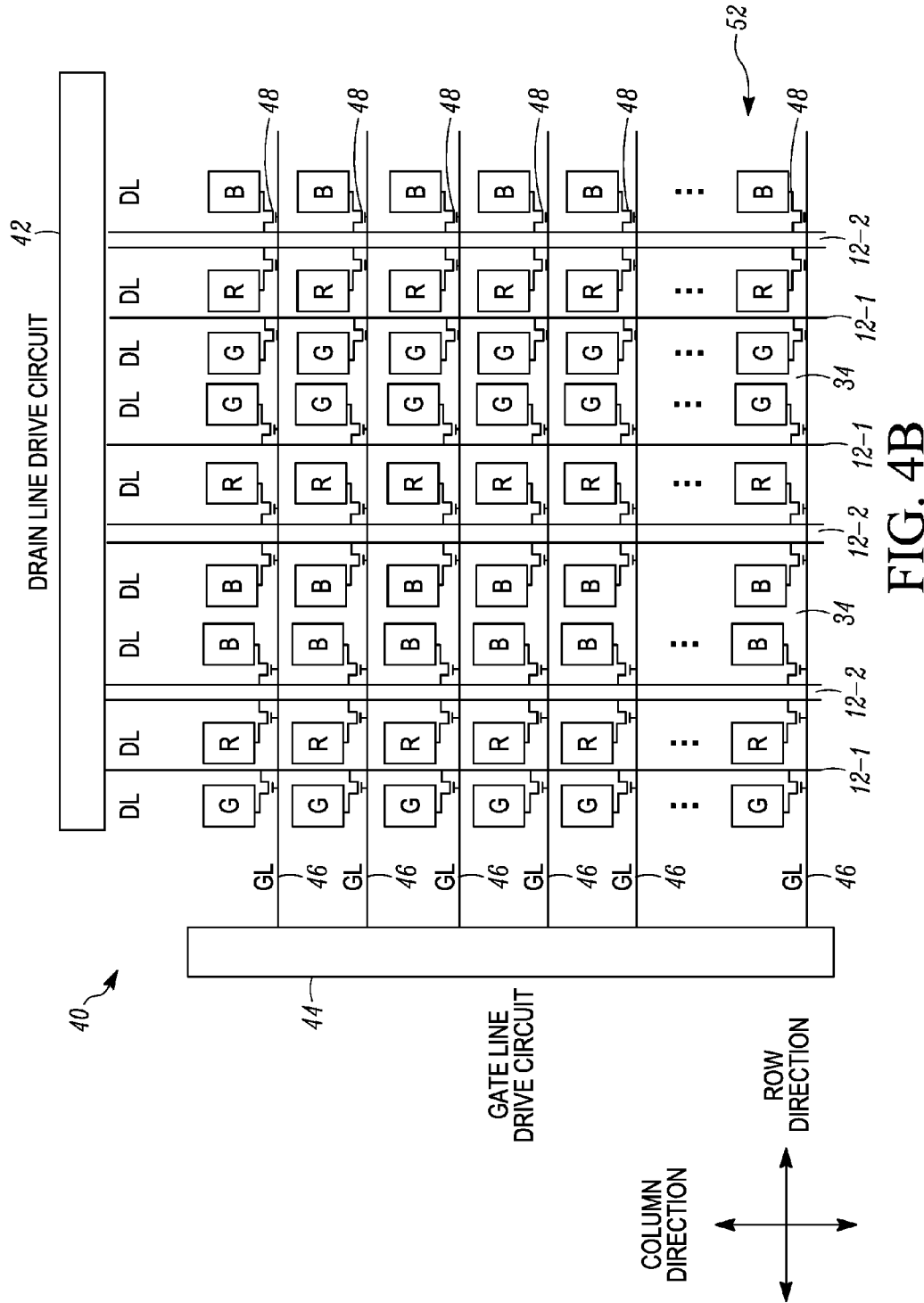
FIG. 4B illustrates another configuration of sub-pixels and drain lines in a liquid crystal display device, according to the third embodiment.

FIG. 4B illustrates another configuration of pixels and drain lines in a liquid crystal display device, according to the third embodiment.

As illustrated by FIG. 4B, the plurality of sub-pixels 14 in the arrangement include the plurality of drain lines 12 formed in the following manner: $G_1, R_2, B_0, B_2, R_1, G_N$, and so forth, where 1 indicates a single drain line (e.g., 12-1), 2 indicates a double drain line (e.g., 12-2), and N indicates no drain line.

In this embodiment, the first sub-pixel is a green sub-pixel having a green color filter, and the second sub-pixel and third sub-pixel are non-green sub-pixels having a non-green color filter. That is, the second sub-pixel is a red sub-pixel and the third sub-pixel is a blue sub-pixel.

FIG. 4B depicts an arrangement of the plurality of sub-pixels 14 having a sequential order of green sub-pixel (first sub-pixel), red sub-pixel (second sub-pixel), blue sub-pixel (third sub-pixel), blue sub-pixel (third sub-pixel), red sub-pixel (second sub-pixel), green sub-pixel (first sub-pixel), in the arrangement and so forth (e.g., G, R, B, B, R, G, ... ). The sequenced order of the plurality of sub-pixels 14 in a given row 52 among the plurality of rows in the arrangement has a repetitious appearance of the first sub-pixel and the third sub-pixel (e.g., the green sub-pixel and the blue sub-pixel, respectively). A singular appearance of the second sub-pixel (e.g., the red sub-pixel) occurs when the first sub-pixel and the third sub-pixel have repetitious appearances. In these instances, the second sub-pixel may be adjacent to only the first sub-pixel and the third sub-pixel. For example, the blue sub-pixel and the green sub-pixel have a repetitious appearance while the red sub-pixel has a singular appearance.

The repetitious appearance of the first sub-pixel and the repetitious appearance of the third sub-pixel in a given row 52 among the plurality of rows are separated from each other by the first type of drain line set 12-1, the singular appearance of the second sub-pixel, and the second type of drain line set 12-2. For example, as shown in FIG. 4B, the red sub-pixel (e.g., the second sub-pixel), and the plurality of drain lines 12 separate the two adjacent green sub-pixels (e.g., repetitious appearance of first sub-pixels) and the two adjacent blue sub-pixels (e.g., repetitious appearance of the third sub-pixels). Additionally, the second type of drain line set 12-2 is formed between the first sub-pixel and the second sub-pixel. That is, as depicted by FIG. 4B, the second type of drain line set 12-2 (e.g., double drain line) is formed between the red and the blue sub-pixels.

The sequenced drain line order in the arrangement includes the plurality of drain lines 12 and the non-drain line region 32. The non-drain line region 34 is formed between two adjacent sub-pixels with the repetitious appearance. For example, as illustrated by FIG. 4B, the non-drain line region 34 is formed between the repetitious appearance of the first sub-pixel (e.g., green sub-pixels) and between the repetitious appearance of the third sub-pixel (e.g., blue sub-pixel).

The non-drain line region 34 is formed between two of the first type of drain line sets 12-1 and/or formed between two of the second type of drain line sets 12-2. For example, the repetitious appearance of the first and/or third sub-pixels can include either the single drain line (e.g., 12-1) or a double drain line (e.g., 12-2) on either side of the repetitious appearance. The second type of drain line set 12-2 is formed between the first sub-pixel and the second sub-pixel. That is, as depicted by FIG. 4B, the second type of drain line set 12-2 (e.g., double drain line) is formed between the red and the blue sub-pixels. The non-drain line region 34 is formed in between the two adjacent repetitious appearance sub-pixels bordered by the particular drain line set (e.g., 12-1, 12-2). As such, the non-drain line region 34 is formed between either of the two of the first type or second type of drain line sets (e.g., 12-1, 12-2).

By sequencing the plurality of pixels in a particular arrangement, forming a plurality of drain lines 12 in the arrangement, and/or forming a non-drain line region 34 between adjacent sub-pixels and/or drain line sets, image distortion from color mixing may be improved by decreasing light leakage through an adjacent color filter. Increasing spacing between the color filters 18 via the formation of the plurality of drain lines 12 may increase the aperture width associated with respective sub-pixels, which can decrease the occurrence of light leaking through an adjacent color filter, decreasing the change for color mixture and thereby improving viewing image quality.

With regard to the foregoing description, it is to be understood that changes may be made in detail, without departing from the scope of the patent invention. It is intended that the specification and depicted embodiments are to be considered exemplary only, with a true scope and spirit of the invention being indicated by the broad meaning of the claims.

The invention claimed is:

1. A Liquid Crystal Display (LCD) device, comprising:
a display panel; and
a backlight to illuminate the display panel;
wherein the display panel includes:
  a plurality of gate lines extending in a first direction;
  a plurality of drain lines extending in a second direction; and
  a plurality of sub-pixels, arranged in a matrix,
wherein the plurality of sub-pixels include a first sub-pixel having a first color filter, a second sub-pixel having a second color filter having a different color from the first color filter, and a third sub-pixel having a third color filter having a different color from the first color filter and the second color filter,
  a plurality of drain lines are formed between the plurality of sub-pixels, the plurality of drain lines arranged as a first type of drain line set and a second type of drain line set, wherein the first type of drain line set includes only a single drain line positioned between two adjacent sub-pixels, and the second type of drain line set includes only two drain lines positioned between two adjacent sub-pixels,
  an arrangement of the plurality of drain lines includes a sequenced drain line order of the first type of drain line set, the second type of drain line set, and a non-drain line region, the non-drain line region being a region where no drain lines are formed between two adjacent sub-pixels, and
  the sequenced drain line order has the non-drain line region formed between two of the first type of drain line sets.

2. The LCD device of claim 1, further comprising an arrangement of the plurality of sub-pixels arranged in plurality of rows and columns, wherein the arrangement of the plurality of sub-pixels in a given row among the plurality of rows has a sequenced order of the first sub-pixel adjacent to the second sub-pixel and the second sub-pixel adjacent to the third sub-pixel,
wherein the first sub-pixel is interposed between the first type of drain line set and the second type of drain line set, the second sub-pixel is interposed between the first type of drain line set and the non-drain line region,
the third sub-pixel is interposed between the second type of drain line set and the non-drain line region, and
each sub-pixel in a given column among the plurality of columns includes a color filter, wherein the color filter for each of the sub-pixels in the given column has the same color.

3. The LCD device of claim 1, wherein the sequenced drain line order is a repetition of the first type of drain line set, the second type of drain line set, and the non-drain line region.

4. The LCD device of claim 1, wherein the first sub-pixel is a red sub-pixel having a red color filter, the second sub-pixel is a blue sub-pixel having a blue color filter, and the third sub-pixel is a green sub-pixel having a green color filter.

5. The LCD device of claim 4, further comprising an arrangement of the plurality of sub-pixels arranged in plurality of rows and columns, wherein the arrangement of the plurality of sub-pixels in a given row among the plurality of rows includes a repetitious sequenced order of the red sub-pixel, the green sub-pixel, and the blue sub-pixel,
- wherein the first type of drain line set is formed between the red sub-pixel and the green sub-pixel, the non-drain line region is formed between the green sub-pixel and the blue sub-pixel, and the second type of drain line set is formed between the blue sub-pixel and the red sub-pixel, and
- each sub-pixel in a given column among the plurality of columns includes a color filter, wherein the color filter for each of the sub-pixels in the given column has the same color.

6. The LCD device of claim 4, further comprising an arrangement of the plurality of sub-pixels arranged in a plurality of rows and columns, wherein the arrangement of the plurality of sub-pixels in a given row among the plurality of rows includes a repetitious sequenced order of the red sub-pixel, the green sub-pixel, and the blue sub-pixel,
- wherein the first type of drain line set is formed between the blue sub-pixel and the green sub-pixel, the non-drain line region is formed between the green sub-pixel and the red sub-pixel, and the second type of drain line set is formed between the blue sub-pixel and the red sub-pixel, and
- each sub-pixel in a given column among the plurality of columns includes a color filter, wherein the color filter for each of the sub-pixels in the given column has the same color.

7. The LCD device of claim 4, further comprising an arrangement of the plurality of sub-pixels arranged in plurality of rows and columns, wherein the arrangement of the plurality of sub-pixels is a repetitious sequenced order of the plurality of sub-pixels such that the red sub-pixel and the blue sub-pixel are separated by the second type of drain line set in a given row among the plurality of rows.

8. The LCD device of claim 1, further comprising an arrangement of the plurality of sub-pixels arranged in plurality of rows and columns and includes a plurality of first sub-pixels, a plurality of second sub-pixels and a plurality of third sub-pixels,
- wherein the arrangement of the plurality of sub-pixels includes a sequenced order in a given row among the plurality of rows having a repetitious appearance of the first sub-pixel in which two first sub-pixels are arranged adjacent to each other, a repetitious appearance of the second sub-pixel in which two second sub-pixels are arranged adjacent to each other, and a singular appearance of the third sub-pixel, the third sub-pixel is adjacent to only the first sub-pixel and the second sub-pixel, and
- each sub-pixel in a given column among the plurality of columns includes a color filter, wherein the color filter for each of the sub-pixels in the given column has the same color.

9. The LCD device of claim 8, wherein the repetitious appearance of the first sub-pixel and the repetitious appearance of the second sub-pixel in a given row among the plurality of rows are separated from each other by the first type of drain line set, the singular appearance of the third sub-pixel, and the second type of drain line set.

10. The LCD device of claim 8, wherein the non-drain line region is between the repetitious appearance of the first sub-pixel and formed between the repetitious appearance of the second sub-pixel.

11. The LCD device of claim 8, wherein the first sub-pixel is a green sub-pixel having a green color filter, and the second sub-pixel and third sub-pixel are non-green sub-pixels having a non-green color filter, and
- wherein the second type of drain line set is formed between the second sub-pixel and the third sub-pixel.

12. The LCD device of claim 8, wherein the first sub-pixel is a green sub-pixel having a green color filter, and the second sub-pixel and third sub-pixel are non-green sub-pixels having a non-green color filter, and
- wherein the first type of drain line set is formed between the first sub-pixel and either the second sub-pixel or the third sub-pixel.

13. The LCD device of claim 1, further comprising:
- a first substrate on a back surface side of the display panel; and
- a second substrate on a display surface side of the display panel, the first substrate and the second substrate being opposed to each other,
- wherein the plurality of gate lines and the plurality of drain lines are formed on the first substrate, and the first color filter, the second color filter, and the third color filter are formed on the second substrate.

14. The LCD device of claim 13, wherein the second substrate includes:
- a plurality of color filters including the first color filter, the second color filter, and the third color filter formed thereon, and arranged so as to correspond to each of the plurality of sub-pixels; and
- a light shielding portion formed thereon, to block light from transmitting therethrough, and formed around each of the plurality of color filters,
- wherein a width of the light shielding portion overlapping the first type of drain line set is smaller than a width of the light shielding portion overlapping the second type of drain line set.

15. The LCD device of claim 13,
wherein the second substrate includes:
- a plurality of color filters including the first color filter, the second color filter, and the third color filter formed thereon, and arranged so as to correspond to each of the plurality of sub-pixels; and
- a light shielding portion formed thereon, to block light from transmitting therethrough, and formed around each of the plurality of color filters,
- wherein a width of the light shielding portion overlapping the non-drain line region is smaller than a width of the light shielding portion overlapping the first type of drain line set.

16. The LCD device of claim 13,
wherein the second substrate includes:
- a plurality of color filters including the first color filter, the second color filter, and the third color filter formed thereon, and arranged so as to correspond to each of the plurality of sub-pixels; and
- a light shielding portion formed thereon, to block light from transmitting therethrough, and formed around each of the plurality of color filters, and
- wherein the light shielding portion overlapping the non-drain line region forms two adjacent sub-pixels among the plurality of sub-pixels corresponding color filters to be directly adjacent to each other.

17. A Liquid Crystal Display (LCD) device, comprising:
a display panel; and
a backlight to illuminate the display panel;
wherein the display panel includes:
- a plurality of gate lines extending in a first direction;
- a plurality of drain lines extending in a second direction; and
- a plurality of sub-pixels, arranged in a matrix,
wherein the plurality of sub-pixels include a first sub-pixel having a first color filter, a second sub-pixel having a second color filter having a different color from the first color filter, and a third sub-pixel having a third color filter having a different color from the first color filter and the second color filter,
  - a plurality of drain lines are formed between the plurality of sub-pixels, the plurality of drain lines arranged as a first type of drain line set and a second type of drain line set, wherein the first type of drain line set includes only a single drain line positioned between two adjacent sub-pixels, and the second type of drain line set includes only two drain lines positioned between two adjacent sub-pixels,
  - an arrangement of the plurality of drain lines includes a sequenced drain line order of the first type of drain line set, the second type of drain line set, and a non-drain line region, the non-drain line region being a region where no drain lines is formed between two adjacent sub-pixels, and
  - the sequenced drain line order has the non-drain line region formed between two of the second type of drain line sets.

18. The LCD device of claim 17, further comprising an arrangement of the plurality of sub-pixels arranged in plurality of rows and columns, wherein the arrangement of the plurality of sub-pixels in a given row among the plurality of rows has a sequenced order of the first sub-pixel adjacent to the second sub-pixel and the second sub-pixel adjacent to the third sub-pixel,
  - wherein the first sub-pixel is interposed between the first type of drain line set and the second type of drain line set, the second sub-pixel is interposed between the first type of drain line set and the non-drain line region,
  - the third sub-pixel is interposed between the second type of drain line set and the non-drain line region, and
  - each sub-pixel in a given column among the plurality of columns includes a color filter, wherein the color filter for each of the sub-pixels in the given column has the same color.

19. A Liquid Crystal Display (LCD) device, comprising:
a display panel;
a first substrate on a back surface side of the display panel;
a second substrate on a display surface side of the display panel, the first substrate and the second substrate being opposed to each other; and
a backlight to illuminate the display panel;
wherein the display panel includes:
- a plurality of gate lines extending in a first direction;
- a plurality of drain lines extending in a second direction; and
- a plurality of sub-pixels, arranged in a matrix,
wherein the plurality of sub-pixels include a first sub-pixel having a first color filter, a second sub-pixel having a second color filter having a different color from the first color filter, and a third sub-pixel having a third color filter having a different color from the first color filter and the second color filter;
  - a plurality of drain lines formed between the plurality of sub-pixels, the plurality of drain lines arranged as a first type of drain line set and a second type of drain line set, wherein the first type of drain line set includes only a single drain line positioned between two adjacent sub-pixels, and the second type of drain line set includes only two drain lines positioned between two adjacent sub-pixels, and a non-drain line region, the non-drain line region being a region where no drain line is formed,
the second substrate includes:
  - a plurality of color filters including the first color filter, the second color filter, and the third color filter formed thereon, and arranged so as to correspond to each of the plurality of sub-pixels, and
  - a light shielding portion formed thereon, to block light from transmitting therethrough, and formed around each of the plurality of color filters, and
the light shielding portion overlapping the non-drain line region forms two adjacent sub-pixels among the plurality of sub-pixels corresponding color filters to be directly adjacent to each other.

20. The LCD device of claim 19, further comprising an arrangement of the plurality of sub-pixels arranged in plurality of rows and columns, wherein the arrangement of the plurality of sub-pixels in a given row among the plurality of rows has a sequenced order of the first sub-pixel adjacent to the second sub-pixel and the second sub-pixel adjacent to the third sub-pixel,
  - wherein the first sub-pixel is interposed between the first type of drain line set and the second type of drain line set, the second sub-pixel is interposed between the first type of drain line set and the non-drain line region,
  - the third sub-pixel being interposed between the second type of drain line set and the non-drain line region, and
  - wherein each sub-pixel in a given column among the plurality of columns includes a color filter, wherein the color filter for each of the sub-pixels in the given column has the same color.

* * * * *